(12) United States Patent
Deis et al.

(10) Patent No.: US 6,430,548 B1
(45) Date of Patent: Aug. 6, 2002

(54) OPTIMIZED DATABASE MANAGEMENT SYSTEM

(75) Inventors: David L. Deis; Robert M. Gjullin, both of Corrales; Douglas E. Thorpe, Albuquerque, all of NM (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 08/182,886

(22) Filed: Jan. 18, 1994

(51) Int. Cl.[7] .............................................. G06F 17/30
(52) U.S. Cl. ........................................... 707/2; 707/100
(58) Field of Search ................... 395/375, 400, 395/600, 650; 364/423, 424.01; 342/13, 20; 434/2, 5; 707/2, 7, 1, 3–6, 100–101, 200

(56) References Cited

U.S. PATENT DOCUMENTS

| | | | | |
|---|---|---|---|---|
| 5,278,961 A | * | 1/1994 | Mueller | 395/400 |
| 5,283,894 A | * | 2/1994 | Deran | 395/600 |
| 5,345,586 A | * | 9/1994 | Hamala et al. | 395/650 |
| 5,392,390 A | * | 2/1995 | Crozier | 395/161 |
| 5,421,728 A | * | 6/1995 | Milden | 434/5 |

* cited by examiner

*Primary Examiner*—Hosain T. Alam
(74) *Attorney, Agent, or Firm*—Loria B. Yeadon; Andrew A. Abeyta

(57) ABSTRACT

A computerized method for organizing data from multiple databases into a single database for optimal access. The method includes providing multiple databases, each for storing data in the form of records. A record from each database is read, and the several records are stored in a single record within a combined database. The single record has a format such the several records are each stored in accessible portions of the single record so that they can be retrieved individually or together.

5 Claims, 4 Drawing Sheets

OPTIMIZED DATABASE MANAGEMENT SYSTEM

GOVERNMENT RIGHTS

The Government has rights in this invention pursuant to Contract No. F33600-88-G-5107, awarded by the Department of the Air Force.

BACKGROUND OF THE INVENTION

This invention relates generally to database management systems and, more particularly, to a system for combining data from separate databases into a single database whose records can be partially or completely read in a single access.

Databases are commonly used to provide data on specific topics, such as goods, employees, costs, etc. In the military realm, databases are used in computer systems of aircraft for, among other things, aiding the pilot in avoiding danger. This is referred to as "threat avoidance." Threat avoidance requires many factors to be considered when a previously unknown threat "pops up" near an aircraft. These factors include mission planning, threat avoidance, terrain elevation and others based on the type of mission being performed by the aircraft. Data reflecting these factors is stored in various databases in the aircraft's computer system.

Presently, data from these various databases is retrieved by the aircraft's computer system in a number of separate accesses of memory. In an environment where decisions must be made in fractions of a second, any delay in retrieving vital database information is costly. Ideally, all pertinent information from the relevant databases should be retrieved in an effective and timely manner.

An object of this invention, therefore, is to provide a database management system that allows pertinent information from a number of databases to be combined into a single database and thereby retrieved quickly. Another object of the invention is to provide such a management system that allows a computer system to retrieve the information with a minimum number of accesses of memory. Still another object of the invention is to provide such a management system that permits the computer system to selectively access whole or partial records in the combined, single database as required.

SUMMARY OF THE INVENTION

The invention comprises a computerized method for organizing data from multiple databases into a single database for optimal access. The steps include providing multiple databases, each storing data in the form of records; reading a record from each database; and storing the several records read from the databases in a single record within a combined database, the single record having a format such that the several records are each stored in accessible portions of the single record. With the method, all or part of the single record may be accessed as desired.

Along with such a method is an optimized database management system. The system includes multiple databases, each for storing data in the form of records. The system further includes means for accessing the multiple databases to retrieve a record from each database; a combined database; means for storing the several records from the databases in a single record within the combined database; and means for reading all or part of a single record in the combined database in a single access of the database.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
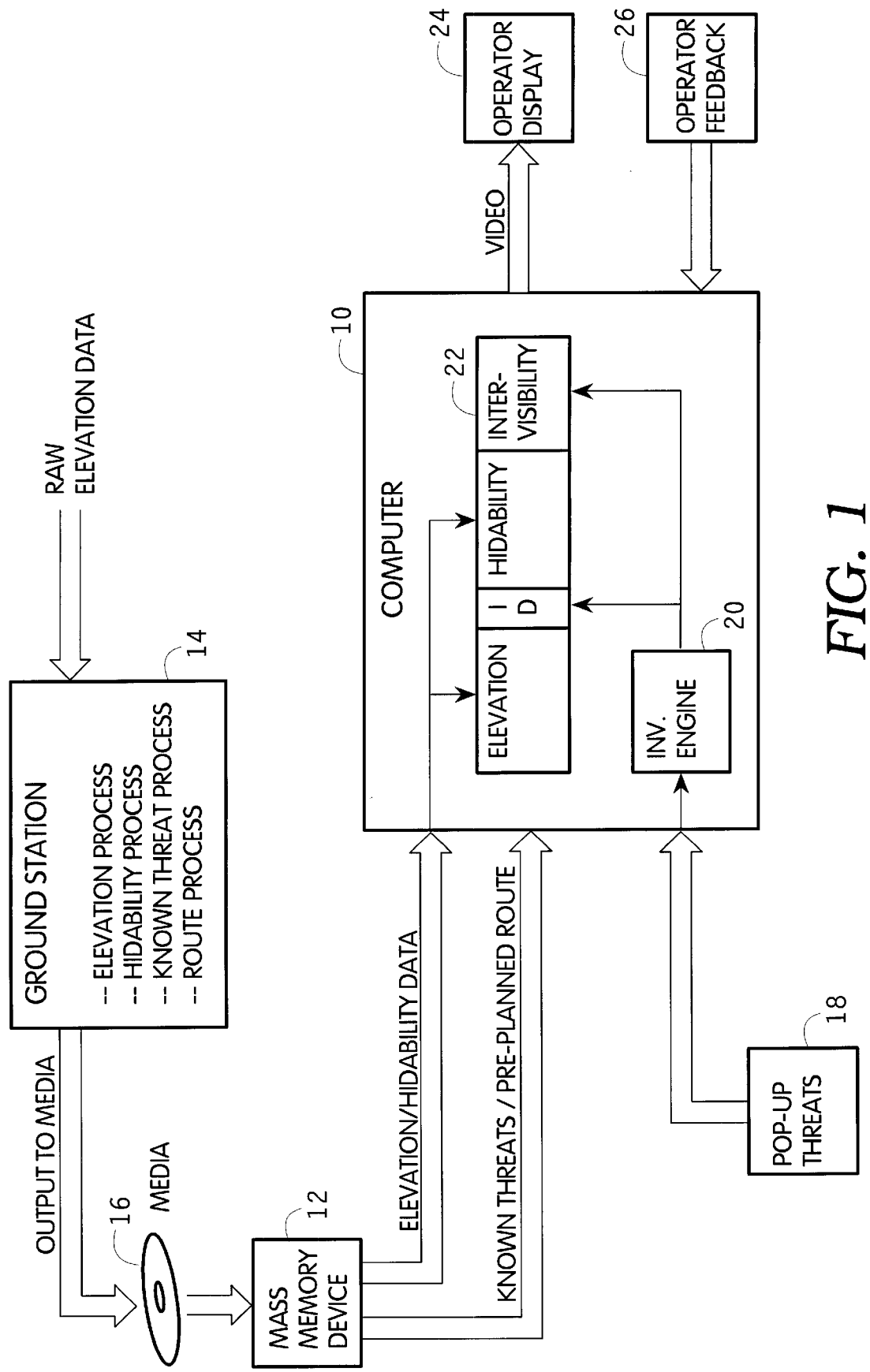
FIG. 1 is a block diagram of a computer system using a database management system according to the invention.

FIG. 1 shows a typical onboard aircraft computer 10 with which this invention may be used. Computer 10 communicates with a conventional mass memory device 12, also on board the aircraft, such as a hard or floppy disk. Device 12 passes elevation/hideability data and known threats/preplanned route data to computer 10. The data for the memory device 12 is generated from a ground station 14 through the execution of a number of processes, including an elevation process, a hideability process, a known threat process and a route process. These processes store the data in one or more separate databases. The ground station data is then provided to the memory device through media 16 such as a disk, although the data could be passed in any number of other well-known ways. The data is stored in the memory device in a manner where it may be retrieved by a database.

Computer 10 also receives data from a "pop up" threats sensor 18 that identifies unknown threats as they are encountered during flight and sends the identifying data to computer 10. The sensor 18 may take any number of forms such as radar, visual sighting, etc., so long as the threat can be identified. The threats data is interpreted by an intervisibility engine 20 that determines when and where the aircraft will be come visible to the threat, i.e., where both the aircraft and threat are visible to each other. The intervisibility engine may take the form of a database in which is stored such data by type of threat and type of aircraft.

Computer 10 is programmed to read records from the databases in the memory device and the intervisibility engine 20 and store the data in a single record within a combined database represented by a single record 22. The combined database may be stored within memory in computer 10 or in device 12. The format of record 22 is such that the several records making up a single record are stored in accessible portions of the single record.

The computer may utilize data in the single record for displaying images on an operator display 24 and may also receive data from the operator 26.

Figure 3:
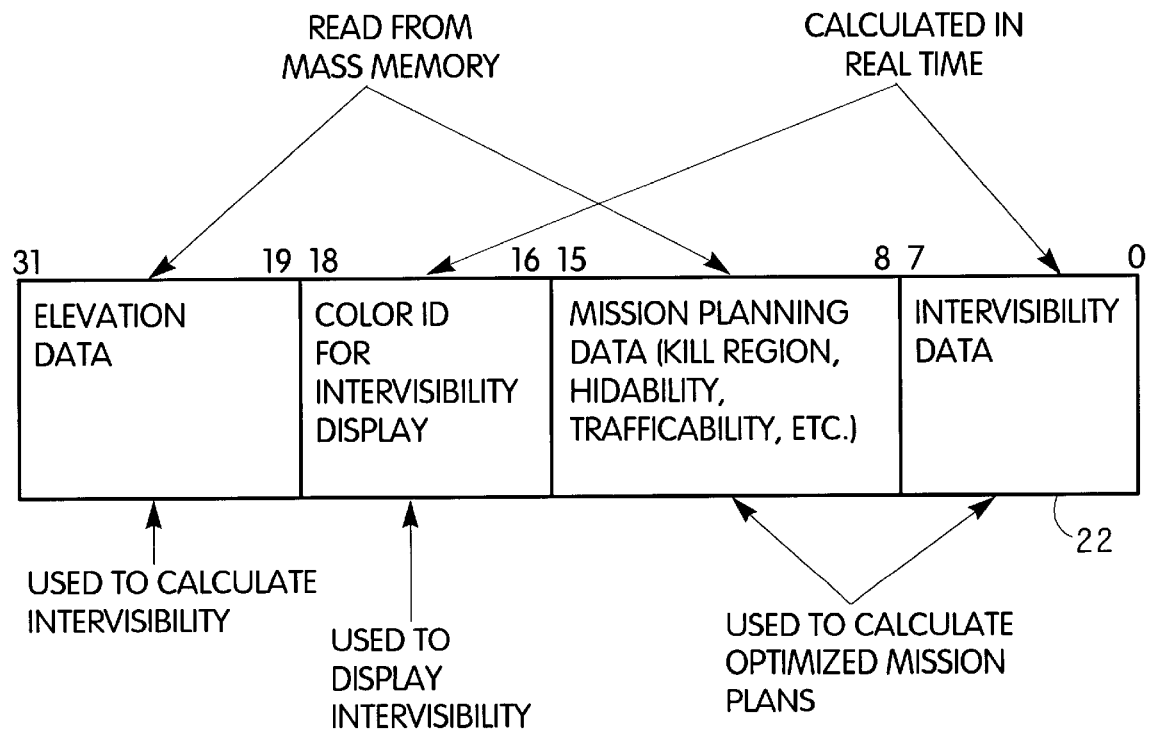
FIG. 3 is a diagram of the format of a data record in the combined database of the database management system.

FIG. 3 shows the details of the record format for this data record in the combined database. The format is a 32-bit word, all or part of which is accessible in a single access by computer 10 to the database. The eight least significant bits are intervisibility data obtained from the intervisibility engine 20 and used to calculate optimized mission plans around threats. The next eight least significant bits are mission planning data based on the elevation/hideability data from databases in device 12. This data is also used to calculate optimized mission plans. Bits 16 through 18 are color identification data for an intervisibility display within the aircraft's cockpit and are used to display intervisibility. The most significant bits, bits 19 through 31, are elevation data from device 12 and are used to calculate intervisibility at different set clearance levels (flying altitudes).

Figure 2A:
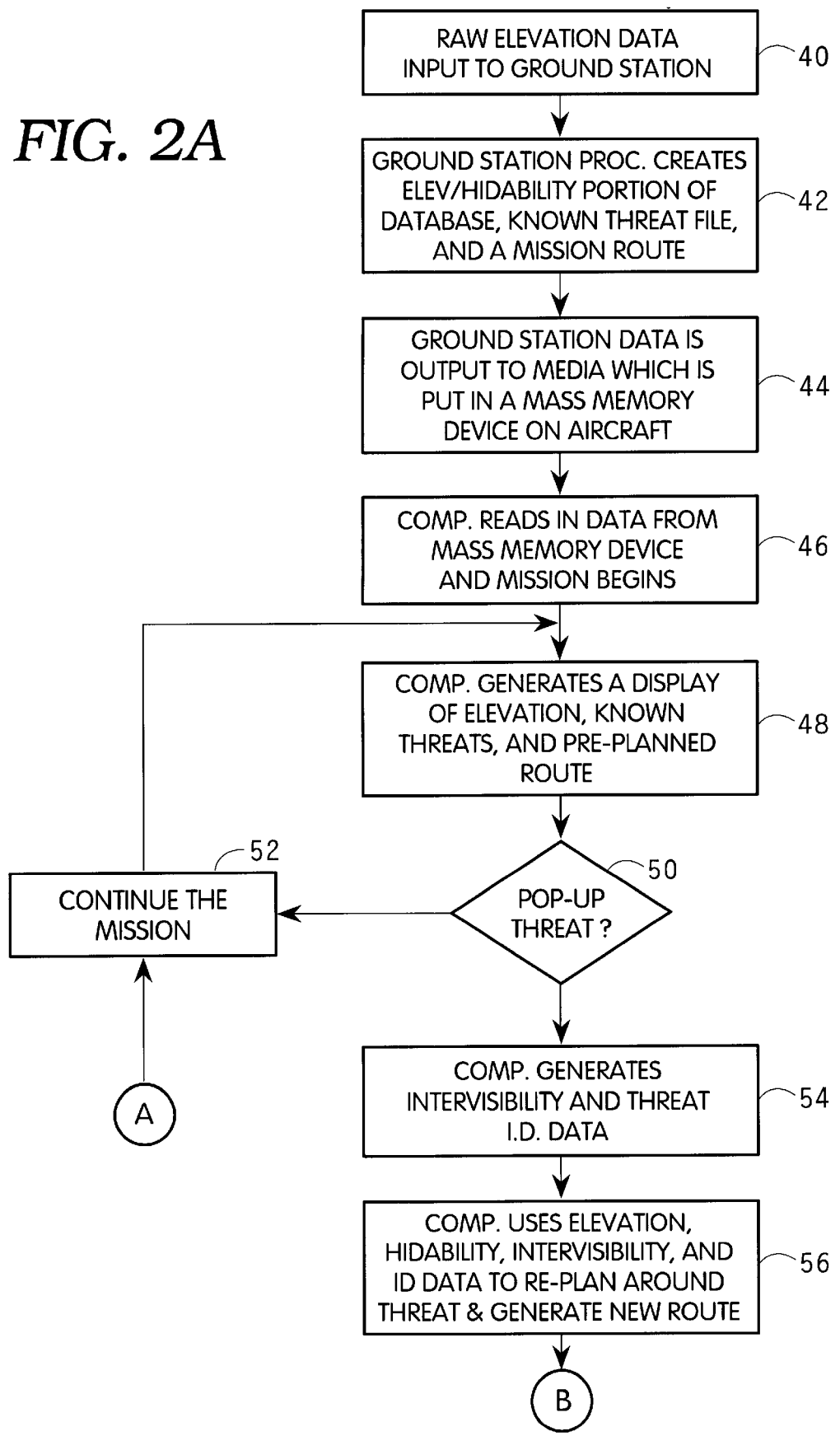
FIGS. 2A and 2B are flow charts illustrating the steps for combining data records from several databases into a single record in a combined database.
Figure 2B:
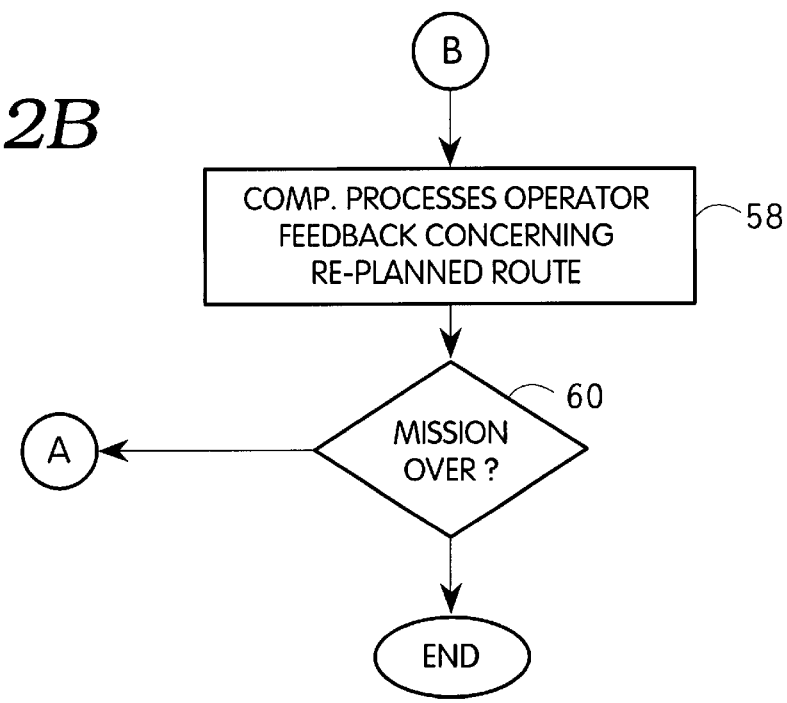

FIGS. 2A and 2B are flow charts illustrating the steps for combining records from the several databases into the single record 22 in a combined database. Initially, raw elevation data is input to the ground station 14 (40). The ground station processes create the elevation/hideability portion of a database, the known threat file and a mission route (42). The ground station data is then output to media 16, which is put in device 12 on board the aircraft (44)

On start up of a mission, computer 10 reads data from device 12 and the mission begins (46). Computer 10 then generates a display of elevation, known threats and the pre-planned route (48). If no pop up threat is detected (50), then the mission continues (52) and the computer continues to generate the display.

If a pop up threat is detected during flight, computer 10 generates intervisibility data and threat ID data via intervisibility engine 20 (54). The computer then uses the elevation, hideability and ID data in the single record 22 to rapidly replan around a threat and to generate a new route (56).

FIG. 2B is a continuation of this process. The computer then processes any operator feedback concerning a re-planned route (58) and checks to see if the mission is over (60). If not, the process returns to step 52 and continues from that point.

By combining the separate databases from device 12 and intervisibility engine 20 into a single database, the total amount of processing time and memory usage needed to support many functions are reduced. This allows the construction of highly integrated, real time threat avoidance systems at a lower cost than prior threat avoidance systems.

Figure 4:
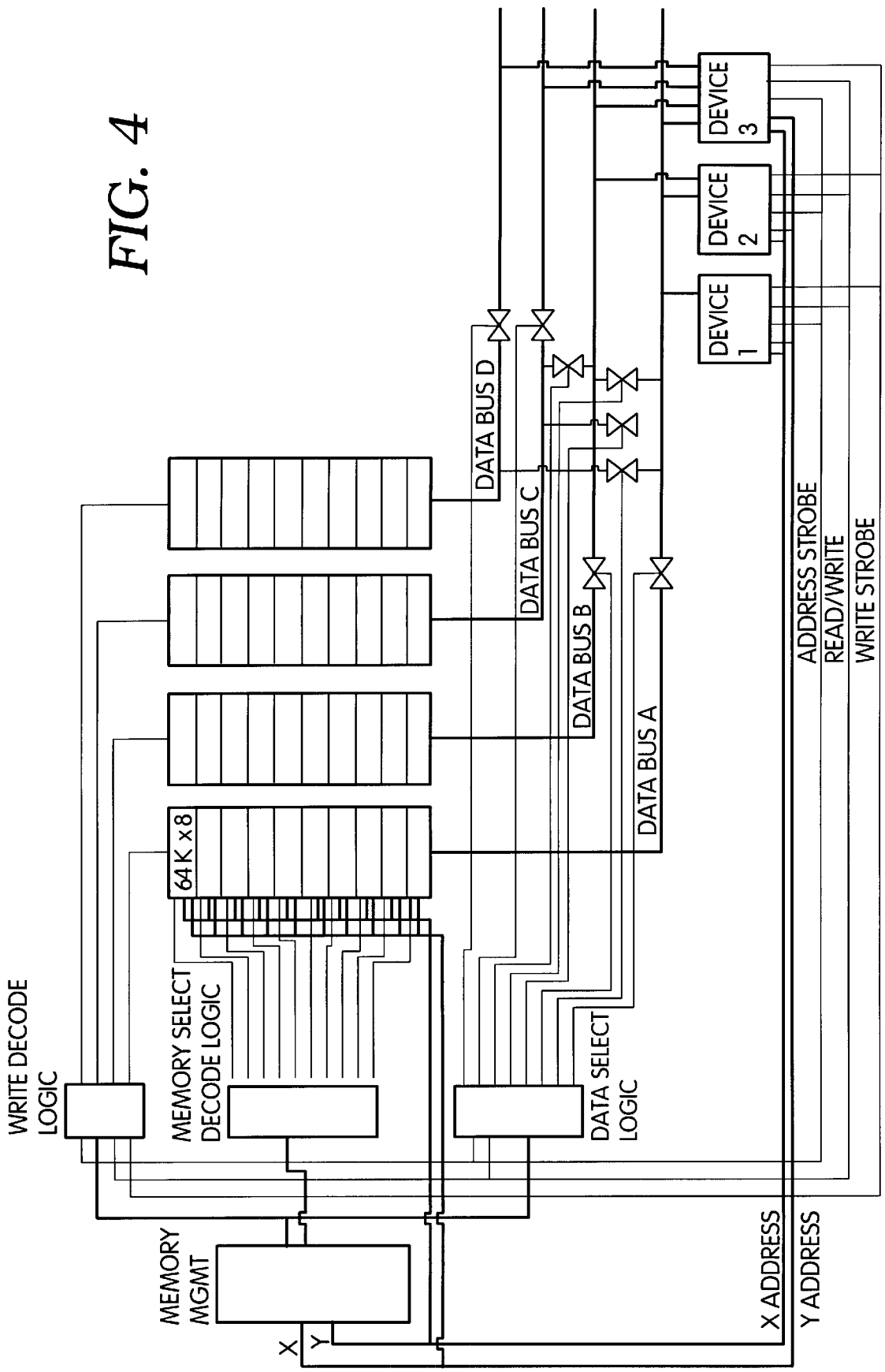
FIG. 4 is a schematic diagram of a circuit for storing the combined database and providing selective access to all or part of its records.

FIG. 4 is a schematic diagram of a preferred embodiment of a circuit for storing the combined database and providing selective access to all or part of its records. Memory Management Units (MMU) are commonly used in embedded processor systems to address large blocks of varying memory types. A MMU traditionally allows the programmer to map logical address space into physical address space. This mapping technique enables the user to mix different memory resources within a convenient logical memory space and has the effect of speeding up system operation because complex addressing operations can be avoided. This technique has been extended in the memory cache architecture of FIG. 4 to not only map what data is being accessed but also the byte placement within that data field.

In practice, the logical address space is broken up into two or more unique address fields; depending upon which field is being addressed the date bytes come out of or written into cache memory in a unique order. This MMU technique has three distinct advantages: several variable width (i.e., 8, 16 and 32 bit) devices can use the same cache memory as loaded and not get locked out of any particular 8-bit data field, post data processing by the addressing device is reduced or eliminated, and all addressing devices do not have to have a 32-bit data port, which frees card I/O for other purposes. The first two advantages contribute directly to system performance. The third advantage is particularly important to embedded processor systems where card I/O is always limited by physical card size constraints.

In FIG. 4, two 12-bit address fields have been broken up into four logical address fields. The upper four bits of each 12-bit field defines the logical address space and lower 8 bits of each address field is hard wired to each 64K×8-bit segment. This addressing scheme is common in embedded processor systems that drive a video display. The cache memory itself consists of four columns of 8-bit data. Each column consists of 10 rows of 64K×8-bit segments for a total of 40 64K×8-bit segments. The MMU registers have 3 fields: one 5-bit field to define what row of memory is enabled across all four columns, one 3-bit field to define what columns are written to during a write operation or defines how the data is multiplexed out of cache memory during a read operation, an additional 4-bit field is user defined to qualify the data. In the example system quadrant 0 is being used to load 40 64K×8-bit segments (A, >A, A>B. A>C, A>D), quadrant 1 is being read by a 16-bit device that requires the upper segment pairs D and C be multiplexed to the lower segment pair A and B (D>A, C>B). and quadrant 2 is being read by a 32-bit device directly out of cache (A>A, B>B, C>C, D>D).

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself. Having illustrated and described the principles of the invention in a preferred embodiment, it should be apparent to those skilled in the art that the invention can be modified in arrangement and detail without departing from such principles. For example, discrete or integrated components of various types may be employed for the various parts of the system, as is known to those of skill in the art. Features of the invention shown in hardware may also be implemented in software and visa versa.

Therefore, the illustrated embodiment should be considered only as a preferred example of the invention and not as a limitation on the scope of the claims. We therefore claim as our invention all modifications and equivalents to the illustrated embodiment coming within the scope and spirit of following claims.

What is claimed is:

1. A computerized method for obtaining data from multiple databases in a single access, comprising:

providing multiple databases, each for storing data in the form of records;

reading a record from each of the multiple databases;

merging the several records read from the databases into a single multiple bit word within a combined database, the multiple bit word having a format such that the several records are accessible from the multiple bit word; and reading part or all of the multiple bit word in the combined database in a single access.

2. An optimized database management system for an aircraft, comprising:

an onboard aircraft computer system, including a memory device;

means for transferring data from a ground station database to the memory device, where the data relates to a plurality of parameters of a flight plan for the aircraft;

a pop up threat sensor for generating threats data connected to the computer system;

intervisibility means within said computer system for creating a database of pop up threats in response to data signals transmitted from the pop up threat sensor; and means for combining data from the intervisibility means with portions of the data in the memory device into a single database as a plurality of multiple bit words, all or part of the multiple bit words are accessible in a single access of the database.

3. The system of claim 2 wherein the multiple bit words comprise an intervisibility data portion, mission planning data portion which is based on hideablity/elevation data, an identification portion and an elevation data portion.

4. The system of claim 3 wherein the multiple bit words are each 32 bits.

5. The system of claim 4 wherein each of the multiple bit words is divided so that 8 bits is occupied by the intervisibility portion, 8 bits are occupied by the mission planning data portion, 2 bits are occupied by the identification portion, and 12 bits are occupied by the elevation data portion.

* * * * *